United States Patent [19]
Butler

[11] 3,898,437
[45] Aug. 5, 1975

[54] GOLF CART MILEAGE AND YARDAGE INDICATING DEVICE

[76] Inventor: Eugene G. Butler, 1770 E. Los Olas Blvd., Apt. No. 503, Fort Lauderdale, Fla. 33301

[22] Filed: Mar. 21, 1974

[21] Appl. No.: 453,522

[52] U.S. Cl.................. 235/95 R; 235/97; 235/121
[51] Int. Cl.² ........................................ G01C 22/00
[58] Field of Search............. 235/95 R, 121, 96, 97; 33/142, 141 R, 141 C

[56] References Cited
UNITED STATES PATENTS

| | | | |
|---|---|---|---|
| 1,913,252 | 6/1933 | Troxel............................. | 235/95 R |
| 2,634,914 | 4/1953 | Lyon................................ | 235/95 R |
| 2,722,833 | 11/1955 | Meshberg......................... | 235/95 R |
| 3,441,209 | 4/1969 | Farman............................. | 235/121 |
| 3,458,128 | 7/1969 | Tillman............................. | 235/95 R |
| 3,571,933 | 3/1971 | Johnson............................ | 235/95 R |

Primary Examiner—Stephen J. Tomsky

[57] ABSTRACT

A mileage and yardage indicating device for use with a power driven golf cart, the device having a drive roll adapted to frictionally engage any wheel of the cart in a manner to drive through a flexible cable, a reduction gear mechanism as the cart wheel rotates, the reduction gear mechanism being connected to a pointer which rotates around a dial to accurately and visually indicate the yardage traveled by the cart, with the reduction gear mechanism also being connected to an odometer mechanism to accurately and visually indicate the total mileage traveled by the cart. The yardage indicating pointer is provided with a manually operable reset lever to provide for resetting the pointer to the zero position without affecting the mileage odometer mechanism. The frictionally engaged drive roll provides a uniform drive to the indicating device regardless of the wheel diameter of the cart.

1 Claim, 8 Drawing Figures

PATENTED AUG 5 1975

3,898,431

SHEET 1

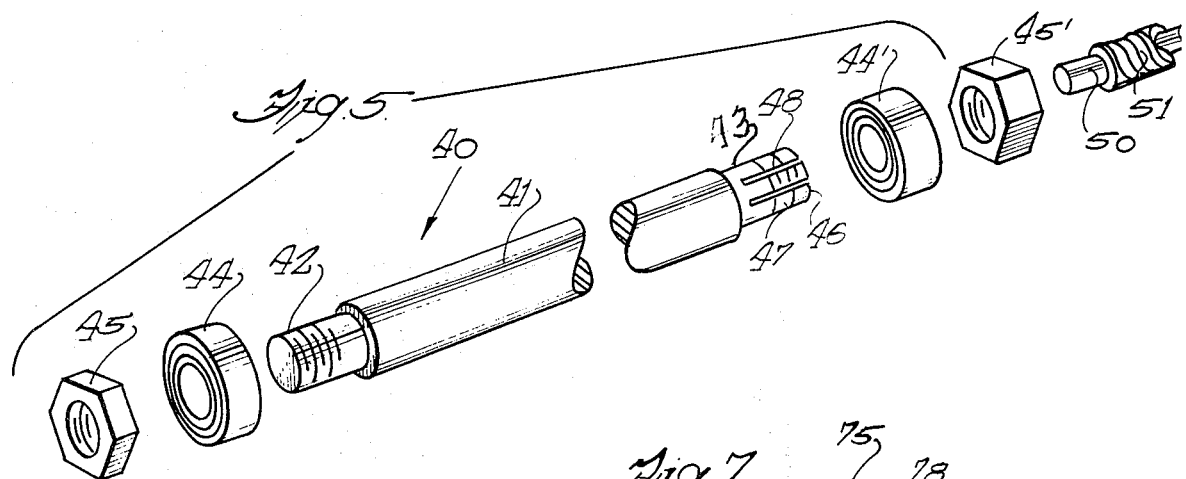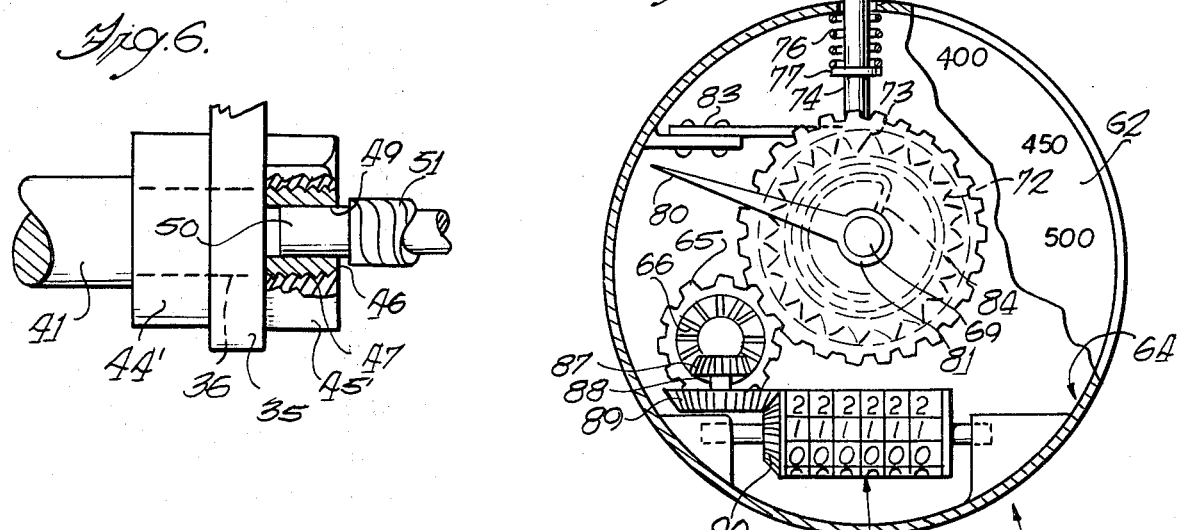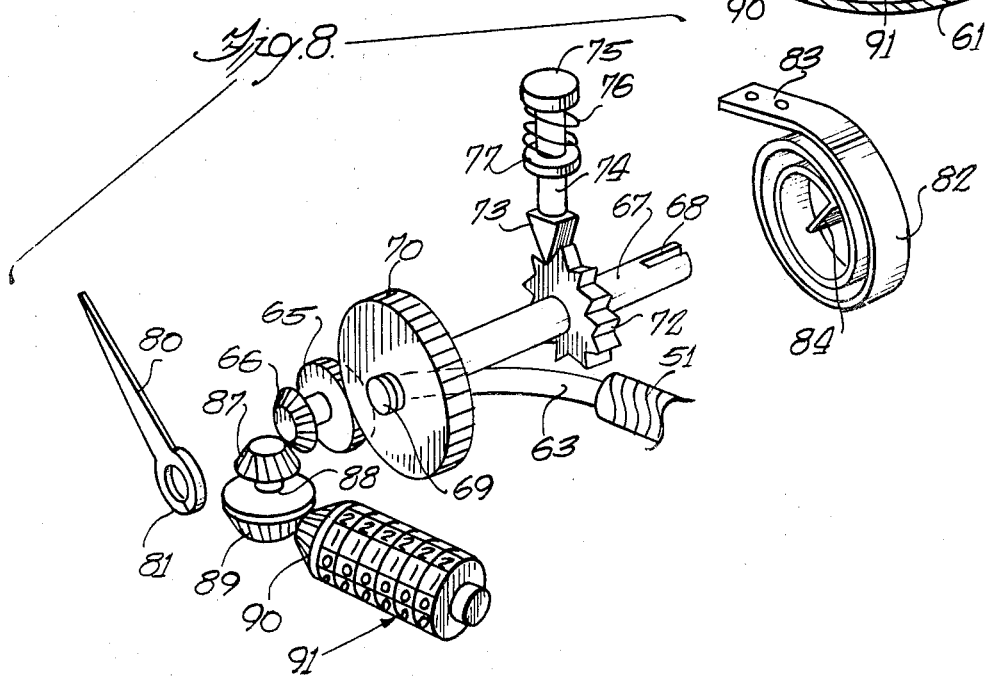

3,898,437

GOLF CART MILEAGE AND YARDAGE INDICATING DEVICE

BACKGROUND OF THE INVENTION

1. Field of the Invention

This invention relates generally to the sport of golf and accessory devices for use therewith for measuring distances traveled by a powered golf cart, and more particularly to a novel and improved mileage and yardage indicating device for a power propelled golf cart.

2. Description of the Prior Art

In the play of the game of golf, the knowledge of distance to the hole is very important as to the selecting of an appropriate golf club for the shot to the hole. Accordingly, each hole is marked at its tee as to the total length from the tee to the hole such that a golfer may select the proper club for the required length of the drive to the hole.

However, after the first drive the golfer is left somewhere between the tee and the hole and must normally estimate the distance from the place at which the ball has come to rest after it has been driven from the tee as to the distance to the hole. This is a difficult distance to estimate with most golfers suffering from the problem of overestimating or underestimating the distance such that they select a golf club which provides too much distance or too little distance as to the length of the drive of the ball to the hole. This is a prevalent cause of lost strokes during a golf game.

In view of this difficulty, there have been many and various efforts in the prior art to provide golf yardage indicators for use by golfers in the play of the golf game, such devices normally intended for attachment to portable golf carts or the like to measure accurately the distance of the tee shot as traveled, the distance from the tee to where the ball has come to rest after the tee shot, and the like. Thus, these devices indicate to an individual operating the golf cart on a golf course the distance he has moved the cart from the tee-off position to where the ball has been hit and comes to rest along the fairway or on the green, this thus permitting the individual to determine the remaining distance to the hole since the distance from the tee to the hole is known.

Among such prior art efforts are those of the type, for example, illustrated in U.S. Pat. Nos. 3,643,860 to R. H. Murphy et. al.; 3,543,304 to V. C. Hed et. al.; 3,441,209 to C. E. Farman; and 3,250,466 to N. T. Tomlinson.

However, these known devices, of those sufficiently accurate to measure and indicate the traveled distance, have not satisfactorily achieved their desired purpose in that they are generally too expensive to purchase, require considerable effort and substantial difficulties in attachment to the golf cart unless the device is designed for a particular type of cart, require difficult adjustments to maintain accurate indications, and are extremely complex in their operation. Further, unless such devices are made for a particular structure or manufacture of cart they are further difficult or impossible to adjust to various wheel diameters and wheel tracks of the many different designs and manufacturers of golf carts presently available.

In addition to the need of a golfer to know the distance in yardage to the hole, there is also required in the use of powered golf carts that the owners of the cart know the mileage traveled by the cart in miles for use in regular maintenance, battery charging requirements, and the like.

SUMMARY OF THE INVENTION

The present invention recognizes the need for an accurate and easily viewable mileage and yardage indicating device for use with powered golf carts, and provides a novel device to accomplish the same which remedies and overcomes all of the foregoing deficiencies and disadvantages of presently available indicating and measuring devices, the device adapted to be readily and easily mounted on golf carts of various types and configurations and made by various manufacturers with a minimum of difficulty and in a rapid and expedient manner to provide an accurate yardage and mileage indicator therefor.

It is a feature of the present invention to provide a universally adaptable mileage and yardage indicating device for various designs of powered golf carts.

A further feature of the present invention provides an improved mileage and yardage indicating device for powered golf carts providing accurate indications of distances traveled thereby with the device being relatively simple in its construction such that it may be readily manufactured at a relatively low cost and by simple manufacturing methods and thus can be retailed at a sufficiently low price to encourage its widespread use.

A further feature of the present invention provides a mileage and yardage indicating device for a powered golf cart which is easy to use and reliable and efficient in operation.

Still a further feature of the present invention provides a mileage and yardage indicating device for a powered golf cart which may, in its entirety, be manufactured and installed as part of the original equipment of the powered golf cart, or which may be readily attached to the powered golf cart later as an accessory item without requiring any special skills or expertise on the part of the installer and without requiring any modification to the powered golf cart.

Still a further feature of the present invention provides a mileage and yardage indicating device for a powered golf cart which is intended for use with golf carts of various manufacturers' designs without requiring adjustment thereto as the device provides a drive roll to accurately provide a uniform drive to the reduction gear mechanism regardless of the supporting wheel diameter of the cart on which the drive wheel engages in that the supporting wheel is merely used as an idler wheel with the determining factor of distance being the rotation of the drive roll.

Yet still a further feature of the present invention provides a mileage and yardage indicating device for use with powered golf carts and which is of a rugged and durable construction and which therefore may be guaranteed by the manufacturer to withstand many years of intended usage.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 5 is an exploded fragmentary perspective view of the spindle supporting the drive roll;

FIG. 6 is an enlarged fragmentary front elevational view of the connector joining the flexible cable to the drive roll spindle;

FIG. 7 is a front elevational view of the indicating dial portion of the device with the dial face partially broken away to illustrate interior details thereof; and FIG. 8 is an enlarged diagrammatic exploded perspective view of the reduction gear mechanism driving the yardage indicating pointer and the mileage indicating odometer.

DESCRIPTION OF THE PREFERRED EMBODIMENT

Figure 1:
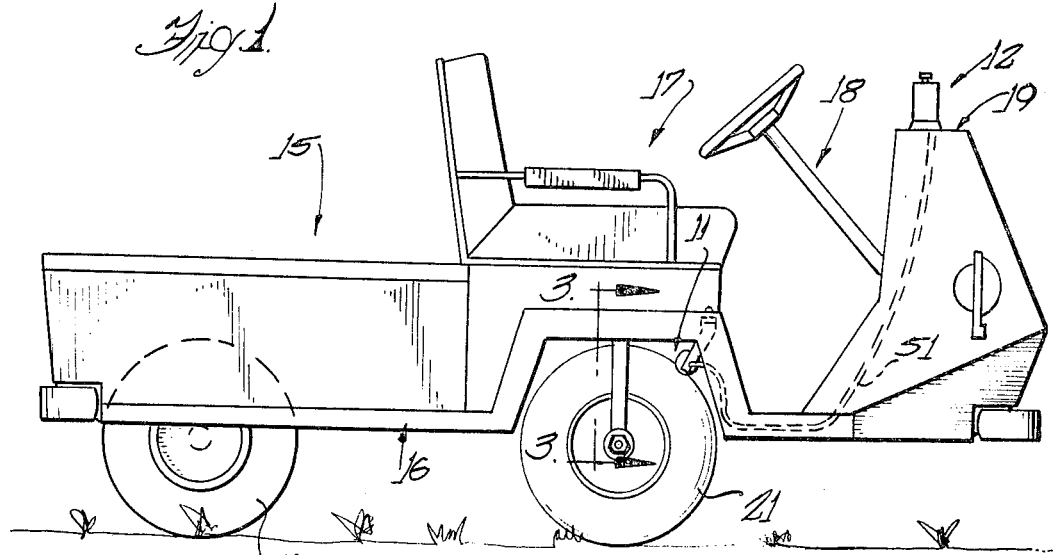
FIG. 1 is a side elevational view of a golf cart having the device of the present invention mounted thereon.
Figure 2:
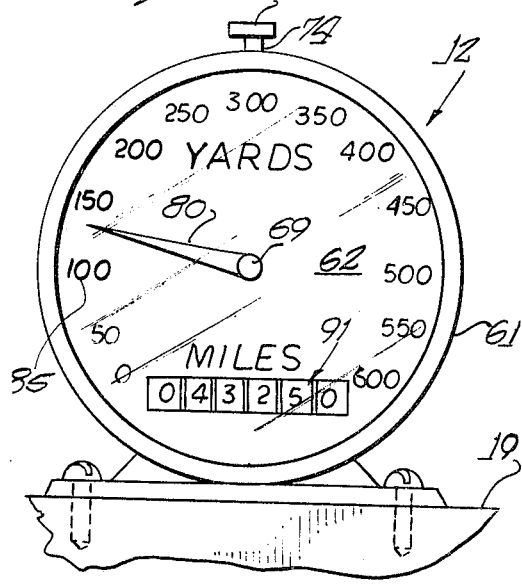
FIG. 2 is a front elevational view of the indicating dial portion of the device of the present invention.
Figure 3:
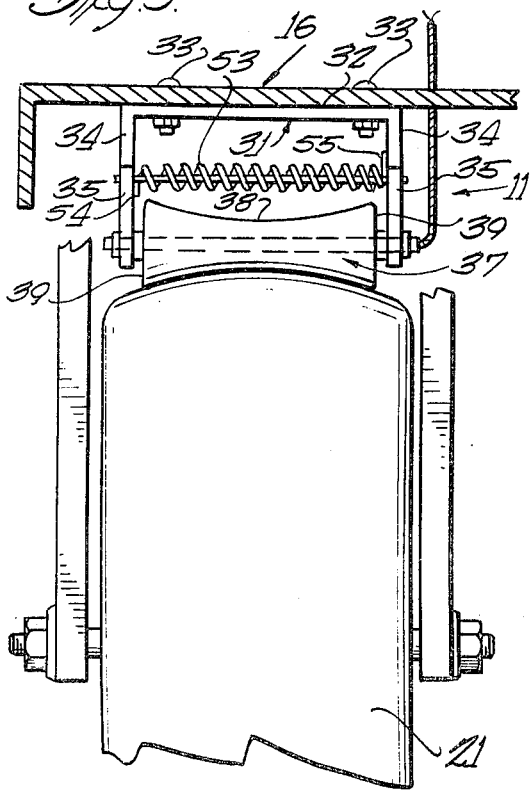
FIG. 3 is an enlarged fragmentary cross-sectional view taken along line 3—3 of FIG. 1.
Figure 4:
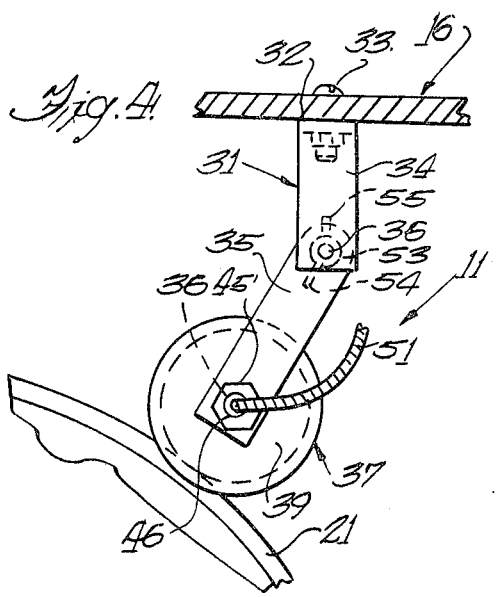
FIG. 4 is a fragmentary side elevational view of the drive roll in engagement with the cart wheel of FIG. 3.

Referring now to the drawings in detail there is illustrated a preferred form of a mileage and yardage indicating device intended for mounting on powered golf carts and the like and which is constructed in accordance with the principles of the present invention and which is comprised generally of two component parts, namely a drive roll unit 11 and a measuring and indicating device 12.

With reference to the drawings as hereinafter set forth in greater detail, it is to be understood that the device is shown as mounted on a powered golf cart which has been selected for purposes of illustration only and is substantially conventional in every way such that the golf cart is illustrated in a somewhat general and stylized fashion. It is to be understood that the device is intended for attachment to any powered golf cart of any size, shape, configuration, and made by various manufacturers. Furthermore, it is understood that while the drive roll unit 11 is shown associated with one of the front wheels of the golf cart, that it may be utilized with any wheel whatsoever of the golf cart whether it be a front wheel or a back wheel.

The golf cart is designated generally by reference numeral 15 and consists of a body 16, a passenger seat 17, a steering wheel 18, a front dashboard type member 19, back supporting wheels 20, and front supporting wheels 21. The drive roll unit 11 is illustrated as being driven by front wheel 21, with the measuring device 12 being illustrated as being mounted on dashboard platform 19.

The drive unit 11 consists of a U-shaped bracket 31 having a bight portion 32 adapted to be affixed by bolt 33 to an underside of a fender portion of body 16 in a direction extending parallel to the axle of wheel 21 and in a position disposed adjacent the thread portion of the wheel, the bight portion terminating in downwardly depending legs 34. Associated with each leg 34 is one of a pair of arm members 35 each having a top end pivotally connected to the associated leg 34 by pivot pin 36 extending between the legs, the opposite ends of each of arms 35 provided with an aperture 36 extending therethrough and adapted to support therebetween a spindle unit 40 on which there is mounted drive roll 37 having longitudinally concave formed circumferal surface 38 extending between opposite ends 39.

The spindle unit 40 consists of a solid cylindrically shaped shaft 41 having reduced diameter neck portions 42 and 43 at each end thereof, the neck portions adapted to be rotatably received in associated ones of apertures 36 in arms 35 with neck portion 42 having a cylindrical bearing 44 fit thereover after which the neck portion is inserted through an aperture 36 and secured in position by a nut 45 being threaded onto the end threaded portion of the neck portion. The neck portion 43 similarly receives a bearing 44' thereover after which it is inserted through an associated aperture 36 and then secured in position by a nut 45' being threaded thereonto. However, neck portion 43 is provided with a concentric circular socket extending inwardly thereof from end 46 with the side walls 47 of the neck portion having circumferally spaced apart longitudinally extending slots 48 provided therein opening into the socket with the exterior side walls being generally conically tapered from shaft 41 toward end 46 such that as nut 45' is threaded thereonto it serves to radially depress side walls 47 into socket 49. An exposed end 50 of a flexible drive cable 51 is adapted to be axially inserted into socket 49 and is secured therein by the radial depression of side walls 47 by nut 45' so as to rotate simultaneously about its axis with the rotation of shaft 41. The drive roll 37 is disposed concentric with shaft 41 and affixed thereto such that rotation of the drive roll effects the rotation of the shaft which, in turn, effects the rotation of flexible cable 51.

Disposed concentrically about pivot pin 36 is a coiled spring 53 which extends completely between leg portions 34 and arms 35 with one end 54 affixed to arm 35 and the opposite end 55 affixed to leg 34 such that the spring effects a twisting torque about the pivot pin 36 in a manner to retain drive roll 37 in resiliently biased engagement with the tread portion of wheel 21.

Thus, the drive roll unit 11 is readily mounted to any type golf cart 15 in a manner to provide a uniform drive to the measuring device 12 regardless of the supporting wheel diameter 21 as such supporting wheel is merely used as an idler type wheel with the drive roll 37 being the determining factor in the uniformity of drive transmitted through flexible cable 51 to the measuring device 12. In this manner an accurate measuring of the distance traveled by the cart is provided.

The measuring device 12 consists of a hollow cylindrical housing 61 having a closed back end and cylindrical side walls and an open front end which is closed by a dial face 62. The opposite end 63 of flexible drive cable 51 enters through the back or side walls of housing 61 into interior compartment 64 where it terminates in sprocket gear 65 disposed concentrically thereabout and having associated therewith bevel gear 66, both gears rotating simultaneously with rotation of the flexible cable. A pointer shaft 67 is disposed concentrically with the side walls of housing 61 and extends axially therealong and has a slotted back end 68 and a front end 69, the shaft being supported for rotation in the housing. Spaced slightly inwardly of end 69 is a sprocket gear 70 having gear teeth about its periphery in meshed engagement with the gear teeth of sprocket 65. Spaced inwardly of slot 68 and gear 70 is a toothed ratchet type gear 72 disposed concentrically with shaft 67 and extending radially therefrom, the teeth surfaces thereof acting as camming surfaces in connection with a wedge end 73 affixed to a rod operating member 74 which lies in the plane of gear 72 and projects outwardly therefrom to a position exterior of the side walls of housing 61 to terminate in an enlarged head member 75. Wedge 73 is retained in resilient engagement with gear 72 by means of a spring 76 disposed between the interior surface of the side walls of housing 61 and a spring retainer ring shaped member 77 affixed to rod 74 a distance inwardly from head portion 75. The rotation of gear 72 effects the reciprocal vertical movement of wedge 73 and rod 74 as guided by opening 78 in housing side wall 61. The shaft end 69 projects outwardly of compartment 64 through an opening in dial face 62 where there is affixed thereto a pointer indicator 80 having a split mounting shank 81 which fits about end 69 to secure the pointer thereto. A concentrically coiled spring 82 is provided having one end 83 affixed to housing 61 and having its opposite end 84 received in slot 68, the spring being tensioned upon the clockwise rotation of shaft 67 such that upon removal of wedge 73 from engagement with gear 72 the spring would insert a counter-clockwise force on shaft 67 to return pointer 80 to the zero position. In this regard it is to be understood that gear 70 is affixed to shaft 67 by use of a conventional one-way clutch assembly (not shown) providing for driving rotation of shaft 67 by gear 70 in a clockwise direction and free movement of shaft 67 relative to gear 70 in a counter-clockwise direction.

The dial face 62 is provided with measuring indicia 85 about the periphery of the circumference thereof, such indicia being indicative of yards with the pointer traversing the same as the cart 15 is driven along the golf course from a tee to the place where the ball comes to rest after being driven from the tee, the pointer indicating the yardage from the tee such that by subtracting the yardage traveled from the total yardage of the hole being played a golfer may determine the remaining yardage to the hole and select an appropriate golf club for such length of drive. Upon completion of the play of the hole, the golfer pulls up head 75 of rod 74 to free wedge 73 from gear 72, this permitting spring 82 to drive shaft 67 in a counter-clockwise direction to return pointer 80 to the zero indicating position such that the device is then ready for measuring the distance along a further hole to be played.

The bevel gear 66 is in meshing engagement with a bevel gear 87 which is connected by a shaft 88 to a bevel gear 89 to effect the rotation thereof, the bevel gear 89 being in meshing engagement with the drive bevel gear 90 of a conventional odometer indicating unit 91 having a plurality of wheels operative in a manner to indicate the mileage traveled by the golf cart. In this way the owner of the golf cart always has an accurate indication as to the total mileage on the golf cart for purposes of maintenance, battery charging, and the like.

There is provided a mileage and yardage indicating device for a golf cart having a pointer which accurately measures and marks the yardage traveled by the golf cart and which is resettable to the zero position for fresh usage for the play of each hole, and which simultaneously keeps a permanent record of the total mileage traveled by the golf cart which is not resettable.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A mileage and yardage indicating device intended for use on a powered golf cart having wheels in supporting ground engagement, the device comprising;

a drive roll unit adapted to be mounted to said cart, said drive unit including a roller in contact with any one of said supporting wheels of said cart;

a measuring device adapted to be mounted on said cart in a position providing ease of visibility and viewability to a driver of said cart, said measuring device including a resettable yardage indicating mechanism and a non-resettable total mileage indicator mechanism, and flexible means interconnecting said drive roll unit to said measuring device for operating the same, said drive roll unit comprises;

a bracket adapted to be connected to a body portion of said golf cart adjacent to one of said supporting wheels thereof;

an arm member adapted to be pivotally connected to said bracket;

a shaft rotatably supported at a projecting free end of said arm member and extending outwardly therefrom in a direction parallel to the axle of said supporting wheel;

a roller manufactured of resilient material disposed concentrically with said shaft and affixed thereto for rotation therewith, a portion of the circumference of said roller disposed in a driven engagement with a portion of said wheel such that rotation of said wheel will effect the simultaneous rotation of said roller and said shaft affixed thereto;

spring means resiliently biasing said roller into contact with said wheel; and means associated with one end of said shaft adapted to detachably affix thereto one end of said flexible means for transmitting rotation of said roll unit to said measuring device;

said measuring device comprises;

a hollow closed housing having an open front end;

a dial face affixed to said housing in a position closing said open front end thereof;

yardage indicating indicia extending about the peripheral edge of said dial face and having a zero position;

a pointer shaft extending normal to said dial face and having one end projecting outwardly of said dial face and an opposite end disposed inwardly of said housing, said shaft mounted for rotation relative to said housing, a longitudinally disposed slot extending partially into said inner end of said shaft;

a gear wheel affixed to said shaft slightly inwardly of said face end thereof and disposed inwardly of said dial face, said gear adapted to drive said shaft in one direction while permitting free movement of said shaft in the opposite direction;

a ratchet gear disposed concentrically with said pointer shaft centrally thereof and extending radially therefrom for rotation therewith;

a concentrically coiled spring having one end affixed in said slotted end of said pointer shaft and having an opposite end affixed to said housing, said spring being tensioned upon rotation of said pointer shaft in a first direction by said sprocket gear with said spring force urging said shaft in said opposite direction;

a ratchet lever associated with said ratched gear and having one end in movable contact with said ratchet gear and having its opposite end projecting exteriorly of said housing, said ratchet lever preventing rotation of said pointer shaft in said opposite direction when in engagement with said ratchet gear and permitting said spring to rotate said pointer shaft in said opposite direction when out of engagement with said ratchet gear so as to return said pointer to said position zero;

a pointer having one end adapted to be affixed to said front end of said pointer shaft and having an opposite end adapted to point to respective yardage indicia on said dial face as said pointer rotates thereabout; and a sprocket gear disposed concentrically with said opposite end of said flexible drive shaft and in meshed engagement with said first mentioned sprocket gear to drivingly rotate the same in said one direction upon movement of said golf cart.

* * * * *